United States Patent [19]
Wössner

[11] Patent Number: 5,064,030
[45] Date of Patent: Nov. 12, 1991

[54] IMPACT DAMPING UNIT

[75] Inventor: Felix Wössner, Schweinfurt, Fed. Rep. of Germany

[73] Assignee: Fichtel & Sachs AG, Schweinfurt, Fed. Rep. of Germany

[21] Appl. No.: 534,836

[22] Filed: Jun. 7, 1990

[30] Foreign Application Priority Data

Jun. 19, 1989 [DE] Fed. Rep. of Germany ....... 3919945

[51] Int. Cl.⁵ .......................... F16F 9/22; F16F 9/06; F16F 9/36
[52] U.S. Cl. .................................. 188/297; 188/269; 267/64.26
[58] Field of Search .............. 267/64.13, 64.15, 64.26, 267/124, 127; 188/151 A, 269, 276, 277; 92/51, 62, 63, 66; 277/DIG. 6, 26, 235 A

[56] References Cited
U.S. PATENT DOCUMENTS 3,993,294 11/1976 Wossner et al. .................. 267/64 R
4,856,762 8/1989 Selzer ................................ 267/64.12

FOREIGN PATENT DOCUMENTS 2457938 1/1991 Fed. Rep. of Germany .

Primary Examiner—Robert J. Oberleitner
Assistant Examiner—Chris Schwartz
Attorney, Agent, or Firm—Brumbaugh, Graves, Donohue & Raymond

[57] ABSTRACT

According to an illustrative example of the invention, an impact damper comprises two telescopically arranged tubes. Working chambers are defined within the tubes, and a fluid is contained within the tubes. The fluid biases the tubes towards a relative rest position. This rest position is defined by abutments of both tubes. In case of impact, the tubes are moved with respect to each other, and damping fluid is urged through a damping orifice between adjacent working chambers. In case of excessive temperature, the pressure of the fluid within the telescopic tubes is raised so that the pressure of the damping fluid is also raised. This raising pressure may result in a metallic sealing through abutment of the tubes. This metallic sealing may prevent the escape of damping fluid such that the pressure can rise up to a dangerous level. For limiting the pressure rise, an emergency escape passage is provided across the location of abutment.

17 Claims, 2 Drawing Sheets

IMPACT DAMPING UNIT

BACKGROUND OF THE INVENTION

An impact damping unit is used, for example, in motor vehicles for supporting a push rod with respect to the vehicle frame and for damping impacts, if the motor vehcle approaches an obstacle.

Such impact damping units are frequently biased by a volume of pressurized gas towards a rest position and contain a liquid which is passed on occurrence of an impact through a restricted office. Both the pressurized gas and the liquid expand on occurence of high temperature, e.g. in case of fire. Due to this expansion, there might occur a deformation of the components of the impact damping unit such that components separate from each other with considerable velocity. This separation at high velocity can be dangerous for persons and objects present in the surroundings of the damping unit.

STATEMENT OF THE PRIOR ART

From German publication 24 57 938 a gas spring is known which is provided with a weakened area such that in case of a crash, the gas spring is destroyed at the weakened area and gas can escape. This destruction at the location of weakening does not occur, however, in case of fire without crash.

OBJECT OF THE INVENTION

It is an object of the present invention to provide an impact damping unit in which an escape of the filling fluid is possible in case of excessive temperatures.

SUMMARY OF THE INVENTION

An impact damping unit comprises an internal tube member having an axis and two end portions, namely a first end portion and a second end portion. The internal tube member is closed adjacent the first end portion and is provided with first support means adjacent said first end portion for supporting engagement with a first construction unit, e.g. the framework of a motor vehicle. A cavity is defined within the internal tube member axially between said first and said second end portion. A floating separating piston is provided within the cavity. The floating separating piston defines two working chambers within the cavity, namely a first working chamber adjacent said first end portion and a second working chamber adjacent said second end portion. A second tube member surrounds the first tube member and is slidably mounted on said first tube member for telescopic movement with respect thereto along said axis. Said external tube member has a closed end adjacent said second end portion of said internal tube member. A further working chamber is defined within said external tube member axially between said second end portion of said internal tube member and said closed end of said external tube member. Restricted flow passage means are provided between said second working chamber and said further working chamber. A damping fluid is contained within said further working chamber. Said second working chamber is accessible to said damping fluid through said restricted flow passage means. Balancing means are provided within said first working chamber, such as to bias said floating separating piston towards said second end portion. Abutment means are provided on said internal tube member and on said external tube member for cooperatingly defining a rest position of said external tube member with respect to said internal tube member. In this rest position said further working chamber has a maximum volume. The balancing means bias said external tube member through said floating separating piston and said damping fluid towards said rest position in which said abutment means on said internal tube member and said abutment means on said external tube member are in mutual abutment condition. Sealing means are provided between said internal tube member and said external tube member for preventing escape of damping fluid out of said further working chamber. Emergency escape means are provided for emergency escape of damping fluid out of said further working chamber across said abutment means. Second support means are provided on said external tube member for supporting engagement with a further construction unit, e.g. a push rod.

In this construction, in case of excessive temperatures, the sealing means, which are made, for example, of elastomeric material, will be destroyed, such as to lose their sealing function. In such case, the damping fluid can escape across the sealing means towards atmosphere. Due to the existence of the emergency escape means, it is warranted that the damping liquid can also escape across the abutment means even if the abutment means form a metallic sealing system under elevated internal pressure. The sealing means may be selected such that they lose their sealing function at e.g. 350° C. Thus, any risk of explosion of the damping unit is avoided.

If the balancing means are provided by a volume of pressurized gas, and the separating piston is provided with piston sealing means sealingly engaging a radially inner wall of the internal tube member, a further risk may occur in case of excessive temperature: the risk of excessive pressure within the balancing chamber. While the sealing function of the piston sealing means may be lost at such excessive temperatures, there is the possibility that the separating piston moves into a position in which it closes the restricted flow passage means. In such case, the pressurized gas cannot sufficiently escape through the restricted flow passage means into the further working chamber. In other words: a further metallic sealing system will be created between the floating separating piston and the end wall containing the restricted flow passage means. In order to nevertheless allow escape of the pressurized fluid, gas escape means can be provided which permit the escape of pressurized gas from the balancing chamber towards the further working chamber in case of loss of the sealing function of the piston sealing means, even if the floating separating piston is in engagement with the end wall. These gas escape means may be provided by forming recesses within the floating separating piston or within the end wall or within both of them.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
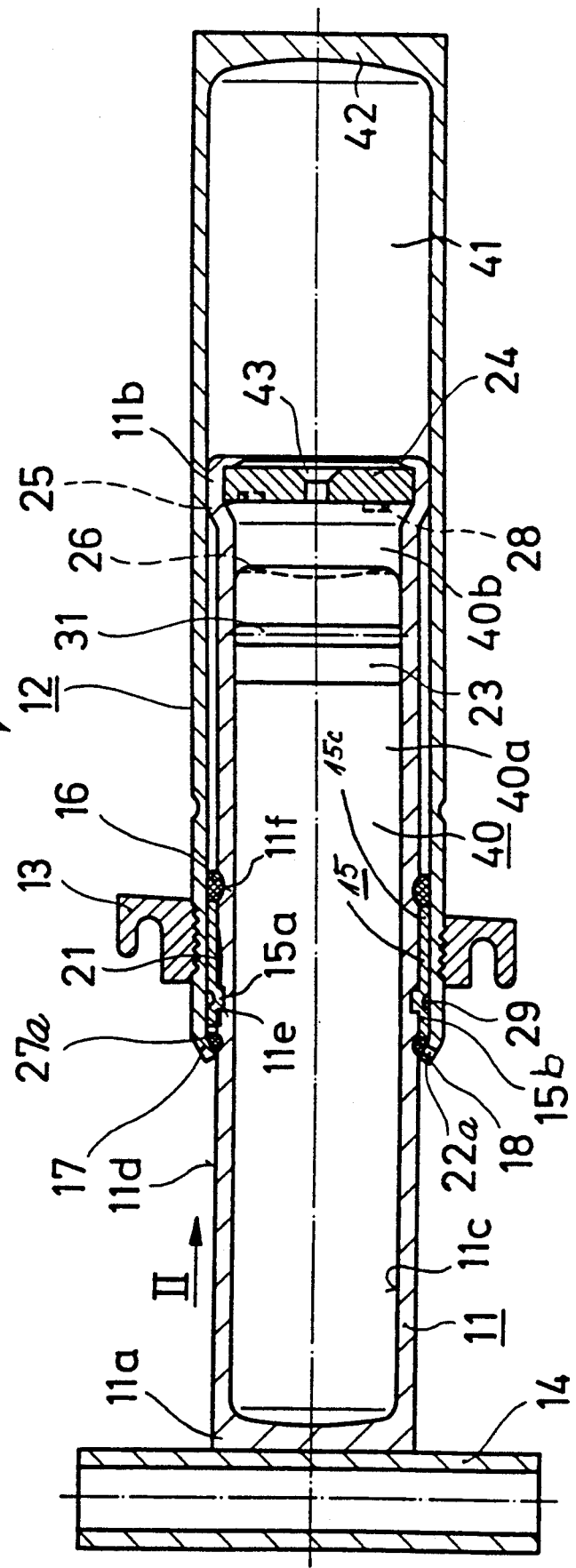
FIG. 1 shows a longitudinal section of an impact damping unit.
Figure 2:
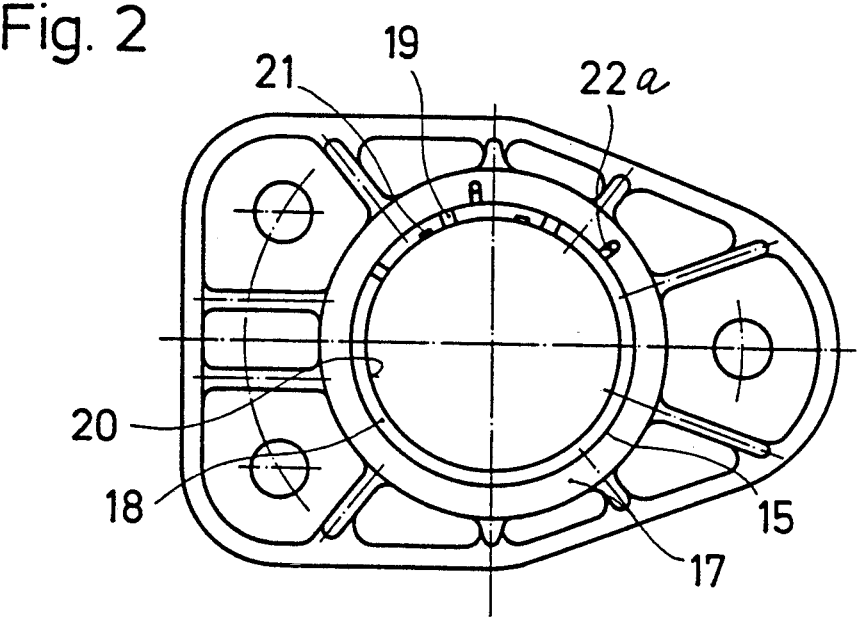
FIG. 2 shows an end view of the external telescopic tube member, viewed in direction II of FIG. 1 with different possibilities of emergency escape means in a diagrammatic representation.

The impact damping unit 10 of FIG. 1 comprises an internal tube 11 and an external tube 12. The external tube 12 is telescopically guided on the internal tube 11. The internal tube 11 is provided adjacent its left-hand end portion 11a with a support sleeve 14 for being connected to a framework of a motor vehicle or to a push rod. The external tube 12 is provided with a flange member 13 for being connected to the other one of said framework and said push rod.

The internal tube 11 is partially closed adjacent its second end portion 11b by an end wall 24. A cavity 40 is established within the internal tube 11. This cavity 40 is subdivided by a floating separating piston 23 into a first working chamber and a second working chamber 40b. The floating separating piston 23 is provided with a piston sealing ring 31 which is in sealing engagement with an inner face 11c of the internal tube 11. A further working chamber 41 is established within the external tube 12 between the end wall 24 and a bottom wall 42 of the external tube 12. The working chambers 40b and 41 are interconnected by a restricted orifice 43 extending through the end wall 24.

The external tube 12 is guided on a slide bush 15 which is provided on a radially outer surface 11d of the internal tube 11. The slide bush is fixed on the internal tube member 11 by a projection 15a engaging into a groove 11e of the internal tube 11. The projection 15a is established by forming a depression 29 in the radially outer face of the slide bush 15. The slide bush 15 has a right hand terminal portion 15c and a left hand terminal portion 15b.

A sealing ring 16 is provided adjacent the terminal portion 15c of the slide bush 15. This sealing ring 16 is located in an annular groove 11f of the internal tube 11. This sealing ring 16 seals a body of liquid which is contained within both the second working chamber 40b and the further working chamber 41.

The left-hand terminal portion 15b of the slide bush 15 forms an abutment which cooperates with a conical, radially inwardly bent end portion 17 of the external tube 12. This end portion 17 forms a shoulder portion 17.

The working chamber 40a contains a volume of pressurized gas. This pressurized gas exerts pressure onto the damping liquid within the working chambers 40b and 41. By this pressure of the damping liquid the external tube 12 is biased towards a rest position as shown in FIG. 1. This rest position is defined by the left-hand terminal portion 15b of the slide bush 15 and the shoulder portion 17 of the external tube 12. An additional sealing ring 27a is provided radially inwards of the shoulder end portion 17 for preventing the entrance of dust into the annular space between the internal tube 11 and the external tube 12.

On the occurrence of impact, the external tube 12 is telescopically moved to the left in FIG. 1 such that the working chamber 41 becomes smaller, and liquid flows through the orifice 43 into the working chamber 40b. Thereby the separating piston 23 is moved to the left against the pressure of the pressurized gas contained within the first working chamber 40a.

The shoulder portion 17 of the external tube member 12 is provided with slots 22a opening into an outer face 18 of the shoulder portion 17.

When the unit 10 is subjected to excessive temperature, the sealing ring 16 is destroyed, and the damping liquid can escape across the location of the sealing ring 16. Even if the pressure of the gas and the liquid within the unit 10 become very high, there will be no risk that a metallic sealing system could be established between the slide bush 15 and the shoulder portion 17. Liquid can always escape through the slots 22a. It is to be noted here that the slide bush 15 is not in sealing engagement with the internal tube 11 and the external tube 12. The additional sealing ring 27a is not a pressure-tight sealing ring will at least lose its sealing function at excessive temperatures.

If the damping liquid of working chamber 41 can escape across the sealing ring 16 and through the slots 22a into atmosphere, the separating piston 23 will move to the right in FIG. 1 so that it comes into contact with the end wall 24. Assuming now that the sealing ring 31 has also become untight due to excessive temperature, the gas pressure within the working chamber 40a could escape towards the working chamber 41 across the sealing ring 31. If, however, the separating piston 23 covers the orifice 43, this escape path could be interrupted. In view of this, a pit 26 is provided in the right-hand end face of the separating piston 23, and a recess 25 is provided in the end wall 24. So, the gas having crossed the sealing ring 31 can escape through the orifice 43 into the working chamber 41 and from the working chamber 41 across the sealing ring 16 and the slots 22a into the atmosphere. Alternatively, the end wall 24 is provided with projections 28 which are engaged by the separating piston 23 so that again the escape path remains open towards the orifice 43.

Figure 3:
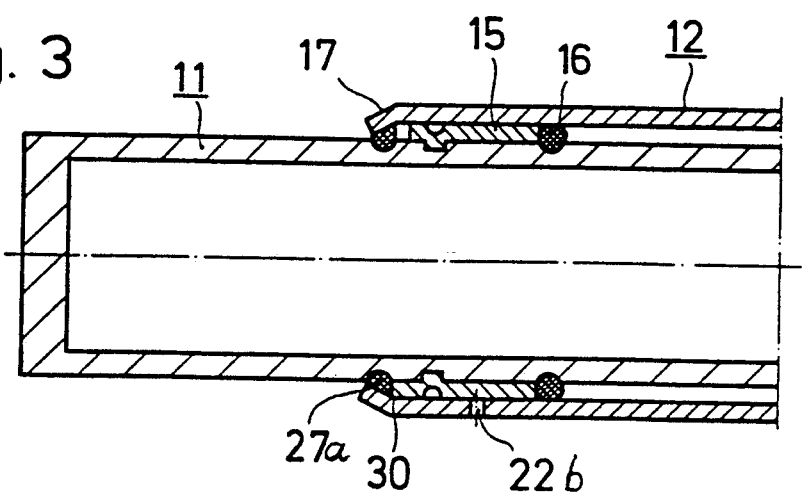
FIG. 3 shows a longitudinal section according to FIG. 1 with a first embodiment of emergency escape means.

In FIG. 3, a further embodiment is shown which is very similar to the embodiment of FIG. 1. Here, a radial bore 22b extends through the external tube 12 between the sealing ring 16 and the sealing ring 27a. In case of destruction of the sealing ring 16, damping liquid can escape through the bore 22b assuming again that there is no tight engagement between the slide bush 15 and the external tube 12.

Figure 4:
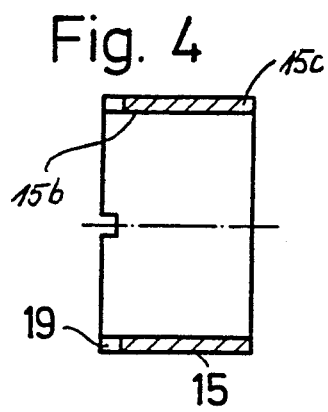
FIGS. 4, 5 and 6 show various forms of emergency escape means provided on a slide bush.

In FIG. 4, there is shown a modified embodiment of the slide bush 15. In this embodiment recesses 19 shaped as slots are provided at the left-hand terminal portion of the slide bush 15. When the shoulder portion 17 of the external tube 12 comes into engagement with the left-hand terminal portion 15b of the slide bush 15, an escape path remains through the recesses 19 and possibly through the slots 22a of FIG. 1. It is well possible, however, that the slots 22a of FIG. 1 are avoided in this case, if there is a gap between the shoulder portion 17 and the radially outer surface 11d of the internal tube 11.

Figure 5:
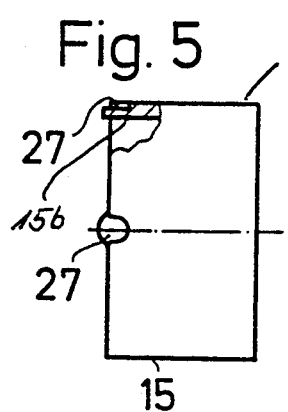

In the embodiment of FIG. 5, the recesses have been shaped as depressions 27 which are open towards the left. The function of these depressions is the same as the function of the recesses 19 of FIG. 4.

Figure 6:
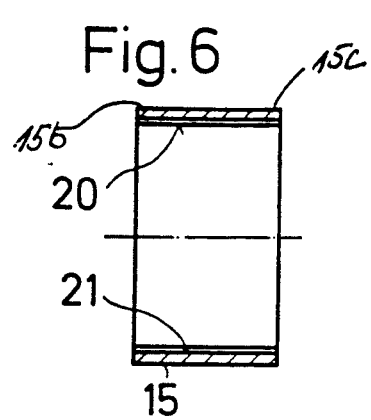

According to FIG. 6, the slide bush 15 is provided with axially extending grooves 21 on its radially inner circumferential face 20. Also these grooves provide an emergency escape across the area of contact between the slide bush 15 and the shoulder portion 17 of FIG. 1.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. An impact damping unit (10) comprising an internal tube member (11) having an axis, a first end portion (11a) and a second end portion (11b), said internal tube member (11) being closed adjacent said first end portion (11a) and being provided with first support means (14) adjacent said first end portion (11a) for supporting engagement with a first construction unit, a cavity (40) being defined within said internal tube member (11) axially between said first and said second end portions (11a, 11b), a floating separating piston (23) being provided within said cavity (40), said floating separating piston (23) defining two working chambers (40a, 40b) within said cavity (40), namely a first working chamber (40a) adjacent said first end portion (11a) and a second working chamber (40b) adjacent said second end portion (11b), external tube member (12) surrounding said internal tube member (11) and slidably mounted on said internal first tube member (11) for telescopic movement with respect thereto along said axis, said external tube member (12) having a closed end (42) adjacent said second end portion (11b) of said internal tube member (11), a further working chamber (41) defined within said external tube member (12) axially between said second end portion (11b) of said internal tube member (11) and said closed end (42) of said external tube member (12), restricted flow passage means (43) being provided between said second working chamber (40b) and said further working chamber (41), a damping fluid being contained within said further working chamber (41), said second working chamber (40b) being accessible to said damping fluid through said restricted flow passage means (43), balancing means being provided within said first working chamber (40a) to bias said floating separating piston (23) towards said second end portion (11b), abutment means (15, 17) being provided on said internal tube member (11) and on said external tube member (12) for cooperatively defining a rest position of said external tube member (12) with respect to said internal tube member (11), wherein in said rest position said further working chamber (41) has a maximum volume, said balancing means biasing said external tube member (12) through said floating separating piston (23) and said damping fluid towards said rest position in which said abutment means (15 on said internal tube member (11) and said abutment means (17) on said external tube member (12) are in mutual abutment condition, sealing means (16) being provided between said internal tube member (11) and said external tube member (12) for preventing escape of damping fluid out of said further working chamber (41), second support means (13) being provided on said external tube member (12) for supporting engagement with a further construction unit, said internal tube member (11) being provided with a slide bush (15) on a radially outer surface (11d) of said internal tube member (11), said slide bush (15) being axially fixed with respect to the internal tube member (11) and having a terminal portion (15b) remote from said second end portion (11b) of said internal tube member (11), said terminal portion (15b) acting as abutment means of said internal tube member (11), said external tube member (12) being provided with a shoulder portion (17) of reduced diameter adjacent a further end of said external tube member (12), said shoulder portion (17) acting as abutment means of said external tube member (12), with said terminal portion (15b) and said shoulder portion (17) defining an abutment zone, said sealing means (16) comprising an annular sealing member (16) adjacent a further terminal portion (15c) of said slide bush (15) located near said second end portion (11b), said annular sealing member (16) being destroyable at a predetermined temperature beyond which a risk of explosion of the impact damping unit (10) exists, said slide bush (15) defining a fluid escape path together with at least one of said internal tube member (11) and said external tube member (12), when said annular sealing member (16) has been destroyed at said predetermined temperature, said fluid escape path being connectable to the atmosphere via at least one of a radial bore (22b) extending through said external tube member (12) at a location along the axial length of said slide bush (15), an orifice extending across said abutment zone between said shoulder portion (17) and said terminal portion (15b) of said slide bush (15), said orifice being defined by at least one of a slot (22a) of said shoulder portion (17) and at least one recess (19, 27) of said terminal portion (15b), said orifice surviving when said shoulder portion (17) and said terminal portion enter into metallic sealing contact in said abutment zone, and said slide bush (15) having an axially extending groove (21).

2. An impact damping unit as set forth in claim 1, said slide bush (15) being axially fixed on said internal tube member (11) by a radially inward deformation (15a) extending into a recess (11e) provided in a radially outer face (11d) of said internal tube member (11).

3. An impact damping unit as set forth in claim 1, said annular sealing member (16) being axially fixed on a radially outer face (11d) of said internal tube member (11).

4. An impact damping unit as set forth in claim 1, additional sealing means (27a) being provided adjacent said shoulder portion (17) of said external tube member (12) between said internal tube member (11) and said external tube member (12).

5. An impact damping unit as set forth in claim 1, said at least one recess (19) of said terminal portion (15b) extending radially through the total radial width of said slide bush (15) and being open towards said first end portion (11a) of said internal tube member (11).

6. An impact damping unit as set forth in claim 1, said at least one recess of said terminal portion (15b) being a radial depression (27) in a radially outer surface of said slide bush (15), said depression (27) being open toward said first end portion (11a) of said internal tube member (11).

7. An impact damping unit as set forth in claim 1, said slide bush (15) having at least one axially extending groove (21) in a radially inner surface of said slide bush (15).

8. An impact damping unit as set forth in claim 1, said damping fluid being a damping liquid.

9. An impact damping unit as set forth in claim 1, said balancing means within said first working chamber (40a) comprising a volume of pressurized gas.

10. An impact damping unit as set forth in claim 1, said floating separating piston (23) comprising annular piston sealing means (31) sealingly engaging a radially inner surface (11c) of said internal tube member (11).

11. An impact damping unit as set forth in claim 1, said piston sealing means (31) being destroyable at a predetermined temperature.

12. An impact damping unit as set forth in claim 11, said restricted flow passage means (43) being provided within an end wall (24) of said second end portion (11b) of said internal tube member (11), said floating separating piston (23) being engageable with said end wall (24) at least in case of loss of damping fluid from said further working chamber (41), said floating separating piston (23) overlying said restricted flow passage means (43) in event of engagement with said end wall (24), at least one of said floating separating piston (23) and said end wall (24) being provided with gas escape means (26, 25, 28) permitting escape of pressurized gas from said first working chamber (40a) towards said further working chamber (41) in event of loss of the sealing function of said piston sealing means (31) even if said floating separating piston (23) is in engagement with said end wall (24).

13. An impact damping unit comprising an internal tube member (11) having an axis, a first end portion (11a) and a second end portion (11b), said internal tube member (11) being closed adjacent said first end portion (11a) and being provided with first support means (14) adjacent said first end portion (11a) for supporting engagement with a first construction unit, a cavity (40) being defined within said internal tube member (11) axially between said first and said second end portions (11a, 11b), a floating separating piston (23) being provided within said cavity (40), said floating separating piston (23) defining two working chambers (40a, 40b) within said cavity (40), namely a first working chamber (40a) adjacent said first end portion (11a) and a second working chamber (40b) adjacent said second end portion (11b), an external tube member (12) surrounding said internal tube member (11) and slidably mounted on said internal tube member (11) for telescopic movement with respect thereto along said axis, said external tube member (12) having a closed end adjacent said second end portion (11b) of said internal tube member (11), a further working chamber (41) being defined within said external tube member (12) axially between said second end portion (11b) of said internal tube member (11) and said closed end of said external tube member (12), restricted flow passage means (43) being provided between said second working chamber (40b) and said further working chamber (41), a damping fluid being contained within said further working chamber (41), said second working chamber (40b) being accessible to said damping fluid through said restricted flow passage means (43), balancing means being provided within said first working chamber (40a) to bias said floating separating piston (23) towards said second end portion, abutment means (15, 17) being provided on said internal tube member (11) and on said external tube member (12) for cooperatively defining a rest position of said external tube member (12) with respect to said internal tube member (11), wherein in said rest position said further working chamber (41) has a maximum volume, said balancing means biasing said external tube member (12) through said floating separating piston (23) and said damping fluid towards said rest position in which said abutment means (15) on said internal tube member (11) and said abutment means (17) on said external tube member (12) are in mutual abutment condition, sealing means (16) being provided between said internal tube member (11) and said external tube member (12) for preventing escape of damping fluid out of said further working chamber (41), said balancing means within said balancing chamber (40a) comprising a volume of pressurized gas, said floating separating piston (23) comprising annular piston sealing means (31) sealingly engaging a radially inner surface (11c) of said internal tube member (11), said piston sealing means (31) being destroyable in response to excessive temperatures, said restricted flow passage means (43) being provided within an end wall (24) of said second end portion (11b) of said internal tube member (11), said floating separating piston (23) being engageable with said end wall (24) in the event of loss of damping fluid from said further working chamber (41), said floating separating piston (23) approaching said restricted flow passage means (43) in case of engagement with said end wall (24), at least one of said floating separating piston (23) and said end wall (24) being provided with gas escape means (26, 25, 28) permitting escape of pressurized gas from said first working chamber (40a) towards said further working chamber (41) in the event of loss of the sealing function of said piston sealing means (31), even if said floating separating piston (23) is in engagement with said end wall (24).

14. An impact damping unit (10) comprising an internal tube member (11) having an axis, a first end portion (11a) and a second end portion (11b), said internal tube member (11) being closed adjacent said first end portion (11a) and being provided with first support means (14) adjacent said first end portion (11a) for supporting engagement with a first construction unit, a cavity (40) being defined within said internal tube member (11) axially between said first and said second end portions (11a, 11b), a floating separating piston (23) being provided within said cavity (40), said floating separating piston (23) defining two working chambers (40a, 40b) within said cavity (40), namely a first working chamber (40a) adjacent said first end portion (11a) and a second working chamber (40b) adjacent said second end portion (11b), a external tube member (12) surrounding said internal tube member (11) being slidably mounted on said internal tube member (11) for telescopic movement with respect thereto along said axis, said external tube member (12) having a closed end (42) adjacent said second end portion (11b) of said internal tube member (11), a further working chamber (41) defined within said external tube member (12) axially between said second end portion (11b) of said internal tube member (11) and said closed end (42) of said external tube member (12), restricted flow passage means (43) being provided between said second working chamber (40b) and said further working chamber (41), a damping fluid being contained within said further working chamber (41), said second working chamber (40b) being accessible to said damping fluid through said restricted flow passage means (43), balancing means being provided within said first working chamber (40a) to bias said floating separating piston (23) towards said second end portion (11b), abutment means (15, 17) being provided on said internal tube member (11) and on said external tube member (12) for cooperatively defining a rest position of said external tube member (12) with respect to said internal tube member (11), in which rest position said further working chamber (41) has a maximum volume, said balancing means biasing said external tube member (12) through said floating separating piston (23) and said damping fluid towards said rest position in which said abutment means (15) on said internal tube member (11) and said abutment means (17) on said external tube member (12) are in mutual abutment condition, sealing means (16) being provided between said internal tube member (11) and said external tube member (12) for preventing escape of damping fluid out of said further working chamber (41), second support means (13) being provided on said external tube member (12) for supporting engagement with a further construction unit, said internal tube member (11) being provided with a slide bush (15) on a radially outer surface (11d) of said internal tube member (11), said slide bush (15) being axially fixed with respect to the internal tube member (11) and having a terminal portion (15b) remote from said second end portion (11b) of said internal tube member (11), said terminal portion (15b) acting as abutment means of said internal tube member (11), said external tube member (12) being provided with a shoulder portion (17) of reduced diameter adjacent a further end of said external tube member (12), said shoulder portion (17) acting as abutment means of said external tube member (12), said terminal portion (15b) and said shoulder portion (17) defining an abutment zone, said sealing means (16) comprising an annular sealing member (16) adjacent a further terminal portion (15c) of said slide bush (15) near to said second end portion (11b), said annular sealing member (16) being destroyable at a predetermined temperature beyond which an explosion risk of the impact damping unit (10) exists, said slide bush (15) defining a fluid escape path together with at least one of said internal tube member (11) and said external tube member (12), when said annular sealing member (16) has been destroyed at said predetermined temperature, said fluid escape path being connectable to atmosphere.

15. An impact damping unit as set forth in claim 14, at least one radial bore (22b) extending through said external tube member (12) at a location along the axial length of said slide bush (15).

16. An impact damping unit as set forth in claim 14, an orifice extending across said abutment zone between said shoulder portion (17) and said terminal portion (15b) of said slide bush (15), said orifice being defined by at least one of a slot (22a) of said shoulder portion (17) and a recess (19,27) of said terminal portion (15b), said orifice surviving when said shoulder portion (17) and said terminal portion enter into metallic sealing contact in said abutment zone.

17. An impact damping unit as set forth in claim 14, said slide bush (15) having at least one axially extending groove (21).

* * * * *

UNITED STATES PATENT AND TRADEMARK OFFICE
CERTIFICATE OF CORRECTION

PATENT NO. : 5,064,030

DATED : November 12, 1991

INVENTOR(S) : Felix Wössner

It is certified that error appears in the above-identified patent and that said Letters Patent is hereby corrected as shown below:

Col. 5, line 30, "external" should read --an external--;
Col. 5, line 32, "internal first" should read --internal--;
Col. 5, line 58, "(15" should read --(15)--;
Col. 7, line 16, "case" should read --event--;
Col. 8, line 47, "a external" should read --an external--.

Signed and Sealed this

Twenty-first Day of September, 1993

Attest:

BRUCE LEHMAN

Attesting Officer     Commissioner of Patents and Trademarks